(12) United States Patent
Munro et al.

(10) Patent No.: US 8,989,414 B2
(45) Date of Patent: Mar. 24, 2015

(54) COMMUNICATIONS SYSTEM

(75) Inventors: Ian Edmund Munro, West Wickham (GB); Kendall Castor-Perry, London (GB); Tarik Zukic, Vienna (AT)

(73) Assignee: Sensorcom Limited, Beckenham (GB)

( * ) Notice: Subject to any disclaimer, the term of this patent is extended or adjusted under 35 U.S.C. 154(b) by 332 days.

(21) Appl. No.: 13/384,953

(22) PCT Filed: Jul. 22, 2010

(86) PCT No.: PCT/GB2010/001398
§ 371 (c)(1),
(2), (4) Date: Mar. 8, 2012

(87) PCT Pub. No.: WO2011/010106
PCT Pub. Date: Jan. 27, 2011

(65) Prior Publication Data
US 2012/0155563 A1    Jun. 21, 2012

(30) Foreign Application Priority Data
Jul. 22, 2009  (GB) .................................. 0912774.7

(51) Int. Cl.
*H04R 25/00* (2006.01)
*H04B 1/034* (2006.01)

(52) U.S. Cl.
CPC ............ *H04B 1/0343* (2013.01); *H04R 25/554* (2013.01); *H04R 2225/51* (2013.01); *H04R 2225/55* (2013.01); *H04R 2460/03* (2013.01)
USPC ............................ 381/315; 381/312; 381/316

(58) Field of Classification Search
USPC ......... 381/312, 315, 316, 320, 321, 330, 331; 600/25; 607/55, 56, 57; 455/90.3, 109, 455/575.2, 575.6, 41.1, 41.2
See application file for complete search history.

(56) References Cited

U.S. PATENT DOCUMENTS

| 5,734,976 | A | | 3/1998 | Bartschi et al. | |
| 5,774,791 | A | * | 6/1998 | Strohallen et al. | 455/41.1 |
| 6,169,813 | B1 | * | 1/2001 | Richardson et al. | 381/312 |
| 6,173,062 | B1 | * | 1/2001 | Dibachi et al. | 381/312 |
| 6,631,197 | B1 | * | 10/2003 | Taenzer | 381/316 |
| 7,599,705 | B2 | * | 10/2009 | Marquis et al. | 455/522 |
| 2003/0118199 | A1 | | 6/2003 | Marquis et al. | |
| 2005/0009583 | A1 | | 1/2005 | Cheung et al. | |
| 2009/0296967 | A1 | * | 12/2009 | Mullenborn et al. | 381/315 |

FOREIGN PATENT DOCUMENTS

EP     1473843      11/2004
WO   2008052575     5/2008

OTHER PUBLICATIONS

International Search Report for PCT Application No. PCT/GB2010/001398 mailed Sep. 10, 2010.

* cited by examiner

*Primary Examiner* — Huyen D Le
(74) *Attorney, Agent, or Firm* — Edward J. Baba; Daniel Stoddard; Bozicevic, Field & Francis LLP

(57) ABSTRACT

A communication system comprises a transmitter unit (10, 60) arranged to be carried by or located near a user, and an earpiece including a receiver unit (30, 70), the system operating with a carrier frequency of less than 100 kHz, preferably less than 30 kHz, most preferably in the range 14 to 20 kHz. The system employs vestigial sideband modulation by cutting off part of an upper sideband. The received signal is digitized and then sampled to an envelope-tracking sampled-data root-filter square detector (40) configured as a digital signal processor.

10 Claims, 3 Drawing Sheets

COMMUNICATIONS SYSTEM

The present invention relates to a communication system, comprising a transmitting unit and antenna and a receiving antenna and unit. In preferred systems, the transmitting unit and antenna are worn on or near a user's body, and the receiving antenna and unit are typically worn substantially within the user's ear canal. The transmitting unit collects a desired audio signal from a source and transmits it to the receiving unit over an inductive or other link.

Such communications systems are often used in situations where the wearing of the equipment must go unnoticed, for instance in covert situations. A widely used form of equipment is the so-called baseband inductive type, where audio signals are directly converted into variations in magnetic flux which can be detected by a standard hearing-aid telecoil (a small coil with many turns of wire on a high permeability core). The transmitted signals are therefore inherently in the audio range, and the receiving used must therefore be sensitive in the audio range. Many forms of electrical equipment emit magnetic flux variations at audio frequencies and these signals can disturb or even completely inhibit the performance of such baseband inductive links.

Commonly in the prior art, this interference is mitigated by modulating the desired audio signal onto a carrier signal. This carrier signal is commonly either in a frequency range where interference levels are lower, or is detected using a means which is less susceptible to the common forms of interference. The carrier frequency is raised to a high frequency, typically in excess of 100 kHz, to make feasible a conventional radio receiver architecture with analog-domain AM detector.

Systems using high frequency amplitude modulation require a complete radio receiver front end in addition to any audio signal processing. This causes problems with power consumption, density of components in the receiver, and the requirement for custom chips the development cost and duration of which are high. Precise frequency determining components are typically needed in both transmitter and receiver to facilitate the ability of the system to transfer the desired signal accurately.

U.S. 2008/0102906 A1 relates to a communication system comprising a transmitter unit which couples to a receiver unit by means of an inductive connection in which audio signals are amplitude modulated onto a carrier signal of frequency between 100 kHz and 30 MHz. Signals are recovered in the receiver by a tuned radio architecture, usually of superheterodyne form and requiring an accurate local oscillator.

Frequency modulated systems have also been employed, sometimes in conjunction with digital signal processing to reduce audible interference, as in U.S. Pat. No. 5,734,976. Demodulation of the FM signal requires more extensive circuitry and custom radio devices are required, which leave no room in the tiny receiver units for more sophisticated audio signal processing.

Time-modulated systems, for instance involving the differentiation of a PWM signal and its recovery at the receiver by means of a latch, have also been used. These systems consume a relatively large amount of power and are hard to combine with standard low-power audio signal processing. An example of such a system is U.S. Pat. No. 5,774,791.

EP 1473843 discloses apparatus for detecting the presence of a module using a 32 kHz out of band signal. The module can be the loudspeaker of a headset.

U.S. 2007/0195978 discloses an arrangement for transmitting data to a hearing aid at a carrier frequency of typically 7 kHz.

The need for a radio receiver with its size and power consumption obstructs the simultaneous adoption of a fully-functional digital signal processor in the highly miniaturized receiving unit, compromising the availability of the many sound-improving algorithms which are available from such devices.

Aspects of the present invention seek to provide circuitry and a method for a communication system having an inductive (or other physical mechanism) link between a body-worn or near-to-body transmitter unit, and an earpiece for exciting the hearing of a user, which can be used in the presence of substantial dynamic electromagnetic disturbances which would disrupt the operation of an audio baseband inductive link of conventional and widely used form.

Aspects of the present invention seek to provide a system and a method with a receiver which can be implemented on a standard, readily obtained integrated circuit or 'hybrid' device developed for use in hearing aids and hearing protection devices.

Aspects of the present invention seek to provide a system and a method employing a range of readily-available broadband components (such as audio amplifiers, antennas and 'hybrid' circuits) at frequencies close to baseband but in such a way that the system continues to function in the presence of interference which would render baseband systems unusable.

Aspects of the present invention seek to combine several signal modulation and processing techniques in a way which mitigates the unacceptable performance which is otherwise encountered when attempting to implement a communication means of other than audio baseband type (but at carrier frequencies below 100 kHz) through the use of components and circuits which are designed for use in hearing aids and hearing protection devices.

Further aspects of the present invention seek to eliminate the use of precision frequency defining circuits, such as resonators or RF filters, in both the transmitter and the receiver, while allowing the free interconnection of any transmitter with any receiver without the need for adjustment, through the use of digital signal processing techniques.

According to a first aspect of the present invention, there is provided a communication system comprising a transmitter unit arranged to be worn or carried by a user, or mounted adjacent to a user, and an earpiece comprising a receiver unit and sound-reproducing transducer means, wherein the transmitter unit comprises an amplitude modulator arranged to modulate a carrier frequency signal with an incoming audio signal and means for transmitting the modulated signal, and wherein the receiver unit is arranged to receive the modulated signals transmitted by the transmitter unit via a link, the receiver unit comprising means for demodulating the received signals and supplying the demodulated signals to the transducer means, and the link has a carrier frequency of less than 100 kHz.

In preferred arrangements the received signal is directly sampled by an analog-to-digital converter (ADC) included in said receiving unit. The preferred sample rate of the ADC is less than four times that of the carrier frequency used by said transmitting unit.

Preferably, the sampled digital data from the ADC is applied to a sampled-data root-filter-square detector in which the digital data is multiplied by itself, applied to a DC-coupled lowpass filter which rejects the carrier frequency components related to the transmitter's operation, and then square-rooted to recover an undistorted and un-interfered replica of the original audio signal. The sampled-data root-filter-square detector may be adapted to the particular requirement of a vestigial sideband system by adjusting the exact functional form of the squaring and square-rooting algorithms to compensate for demodulation non-linearity.

In preferred arrangements, the upper sideband spectrum of an amplitude modulator is modified with filtering techniques to implement a vestigial sideband modulation scheme. The spectrum of the input audio signal to the transmitter unit may be additionally adjusted to optimize and control the modulation of the vestigial sideband modulation scheme.

A preferred receiver comprises: an antenna suited to the inductive, capacitative or electromagnetic transmission method employed by the transmitter; an input matching and filtering circuit for coupling the transmitted signal efficiently to the receiver circuit; an analog-to-digital converter with suitable input gain circuitry which adapts to the received signal level from the antenna; a digitally-implemented root-filter-square detector circuit, a sample-rate-reducing decimation filter, audio processing firmware to reduce the impact of background noise and interference, and drive circuitry to directly energize a loudspeaker or other sound-reproducing transducer for communicating audio information direct to the user's hearing. The electronic portion of the receiver unit is preferably entirely implemented using a standard packaged hearing-aid processing circuit, the functions of which are adapted with custom firmware to provide all the signal processing functions required by the receiver without recourse to the development of custom circuitry. The standard hearing aid circuit may additionally perform functions of hearing enhancement and protection provided by a hearing aid or hearing protector.

According to a second aspect of the present invention, there is provided a communication system comprising a transmitter unit arranged to be worn or carried by a user, or mounted adjacent to a user, an earpiece comprising a receiver unit and sound-reproducing transducer means, with the earpiece being arranged to be worn at least partly in the ear of the user, the transmitter unit and the receiver unit communicating via an inductive link with a carrier frequency of less than 100 kHz.

According to a third aspect of the invention, there is provided a transmitter unit arranged to transmit via a link with a carrier frequency of less than 100 kHz and preferably less than 30 kHz, the unit comprising an amplitude modulator arranged to modulate a carrier frequency signal with an incoming audio signal and a response shaping filter to effect vestigial sideband modulation.

The transmission unit may contain a detector sensitive to the incoming audio signal level, and adapt the transmission mode to a lower powered mode which also incorporates an audible signal to confirm to said user that the receiver continues to detect the transmitter even though the signal currently applied to said transmitter contains no audible information. The operational state of processing blocks operating on input signals and output signals may be adjusted according to the level of the input signal so that the power consumption is optimized without compromise to the audio quality of said link.

In preferred embodiments, the transmission unit contains a detector sensitive to the impedance of the connected audio source and transmits a warning signal informing said user that the audio source has become disconnected from said audio source. The transmitter may contain an audio loudness processor which adjusts the gain and frequency response of the audio signal applied to said transmitter so that the variability of subjective loudness of the audio signal is reduced.

According to a fourth aspect of the invention, there is provided a receiver unit arranged to receive signals via a link with a carrier frequency of less than 100 kHz and preferably less than 30 kHz, the unit comprising means for demodulating vestigial sideband modulated signals received via the link.

Preferred embodiments of the present invention will now be described, by way of example only, with reference to the accompanying drawings, of which:

Figure 1A:
FIG. 1 is a diagram showing the amplitude of various communication signals in relation to frequency.
Figure 1B:

Referring now to the drawings, FIG. 1a is a diagram illustrating the amplitude against frequency of a baseband audio signal. The top of the frequency range lies in the region of 6 kHz. FIG. 1b is a similar diagram illustrating high-frequency amplitude modulation with a carrier frequency over 100 kHz, typically 375 kHz as in FIG. 3 of U.S. 2008/0102906A1. Both sidebands are required for successful am demodulation.

Figure 1C:
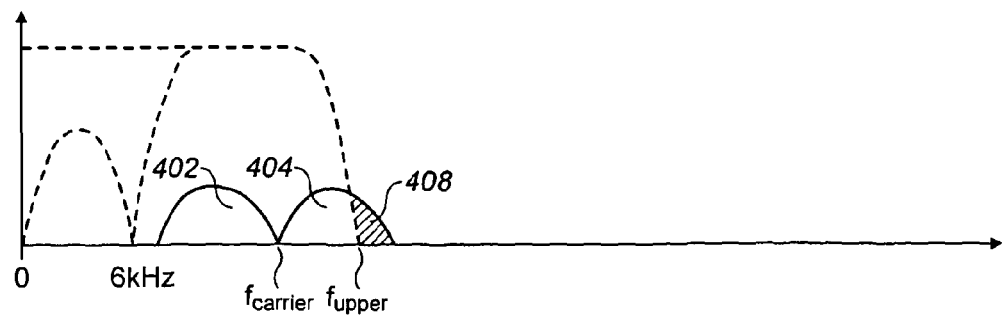

FIG. 1c is a similar diagram illustrating the operation of systems in accordance with embodiments of the present invention, which operate with near-baseband vestigial sideband modulation. The central frequency of the sideband carrier is less than 30 kHz and typically 14 kHz to 18 kHz. The lower sideband is indicated at 402 and the vestigial upper sideband at 404. The shaded portion 408 of the upper sideband is cut off by one or more filter components; if $f_{carrier}$ is 15 kHz, the cut-off frequency lies between 16 and 20 kHz.

Figure 2:
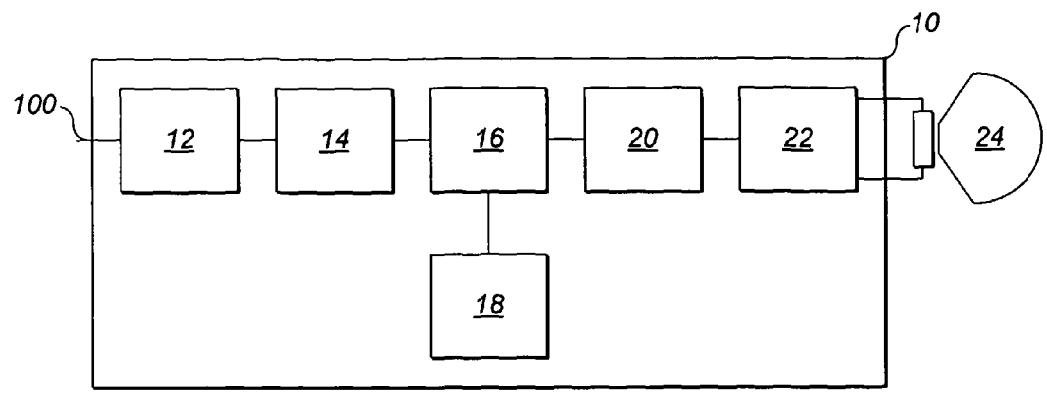
FIG. 2 is a diagram of a transmitter unit for use in a system according to a first embodiment of the present invention.

FIG. 2 shows a transmitter unit 10 for use in a system in accordance with a first embodiment of the present invention. An analog audio signal which has been received from a radio or cell phone etc. at an input connector 100 is first applied to a preamplifier 12 which suitably adjusts the signal level. Preamplifier 12 may incorporate automatic gain control. The signal is then applied to a bandpass filter 14 to eliminate unnecessary low-frequency and high-frequency signals, below $f_{low}$ (typically 150 Hz) and above $f_{high}$ (typically 4 kHz) respectively, which may be produced by wind noise and non-audio circuits in the mobile phone, walkie-talkies or other communication devices typically connected as the source of audio signal. Optionally the volume level of this signal may be adjusted statically or dynamically by conventional gain control circuits to ensure a suitably constant signal level.

The filtered audio signal is then applied to an amplitude modulation circuit 16 where it varies the amplitude of a carrier frequency signal $f_{carrier}$ from a carrier oscillator 18. In the present modulated system, this carrier signal is not substantially higher in frequency than the frequencies in the audio signal. A typical value of this carrier frequency is less than 30 kHz, preferably of the order of 14 kHz-18 kHz.

The amplitude modulated carrier signal is then applied to another response shaping filter 20 which adjusts the relative levels of upper sideband and lower sideband signals, causing an output signal which has vestigial sideband (VSB) modulation. The filtered signal is finally applied to an amplification circuit 22 which produces the necessary current into transmitting loop or coil 24 to create a detectable level of magnetic field in a nearby inductive receiver.

Figure 3:
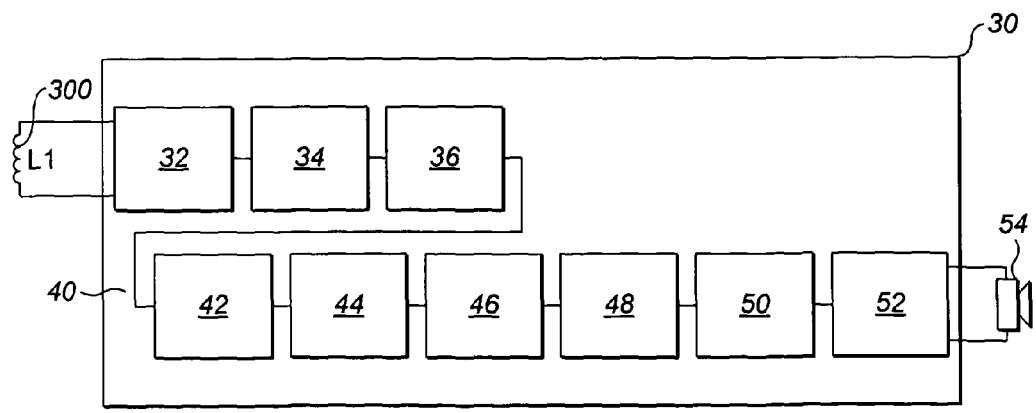
FIG. 3 is a diagram of a receiver unit for use in association with the transmitter unit of FIG. 2 in the first embodiment of the present invention.

FIG. 3 shows a receiving unit 30 for use in the system according to the first embodiment of the present invention. In the receiving unit 30, the incoming VSB signal from the inductive receiving element 300 (typically a telecoil) is fed to an amplifier 32, the gain of which may be dynamically varied to implement an automatic level control. The signal is sampled by an analog-to-digital converter e.g. delta-sigma audio ADC 34 at a sample frequency $f_{sample}$ which is typically between 32 kHz and 48 kHz. It is then low pass-filtered by a decimation filter 36 at an upper cutoff frequency $f_{upper}$, which is typically between 16 kHz and 24 kHz and preferably between 16 kHz and 22 kHz, e.g. 18 kHz. Typically the relationship of $f_{upper}$ to $f_{carrier}$ and to $f_{high}$ is such that the signal sample stream now encodes a vestigial sideband signal where the upper sideband has been partly removed not only by the transmitter's response shaping circuit 20 but also by the filtering actions of the receiver's filter 36. The overall combined response of filters 20 and 36 affects the spectrum of the VSB signal, and this affects the audio frequency response of the overall link, causing a shelf-like or step-like variation of up to 6 dB which can readily be equalized. It does not substantially affect the generation of spurious signals or non-linearities.

The digital signal sample stream is then fed to an envelope detection system to recover the modulation which was applied to the carrier frequency in the transmitter 10. The receiver 30 has no knowledge of the exact carrier frequency used or its relationship with the master clock frequency of the digital signal processing circuitry 40, both of which are subject to component tolerances. Therefore, a synchronous radio-type demodulation circuit cannot be used.

In typical prior art systems, the receiver employs an envelope detector in which the signal is applied to a full wave rectifier circuit, also called an absolute value circuit, and then lowpass filtered to remove the carrier while preserving the envelope, which carries the desired modulation.

A further problem is that, in this system, the close proximity of the signal frequency to the Nyquist frequency (which is defined as equal to half the sample frequency $f_{sample}$) means that significant non-linearity and therefore aliasing is admixed into the resulting demodulated signal, causing objectionable additional frequencies and rendering the signal unacceptably low in quality.

One approach to mitigating the aliasing effect from the full wave rectifier detector is to increase the sample rate. However, to achieve acceptable performance in this application, the sample rate would need to be raised to at least 1 MHz, which is not possible with low-power processing, as employed in hearing aids and earpieces.

The detector circuitry will now be described which makes it possible to accurately recover the audio modulation from the vestigial sideband modulated carrier while mitigating non-linear aliases. This detector or demodulator can be described as an envelope-tracking sampled-data root-filter-square detector. In this detector the incoming signal samples are first squared at block 42, i.e. multiplied by themselves. Optionally, a dynamically adjusted scaling factor k1 is used to give further level control. The resulting data stream, containing signal-related components up to $2f_{high}$ and carrier-related components distributed around $2f_{carrier}$ or its alias, is applied to a lowpass filter 44, which passes the signal-related components but rejects the carrier-related components. The output from this lowpass filter contains the square of the original audio envelope (which comprises the original audio signal plus second order harmonic and intermodulation products), superimposed upon a DC value.

In prior art square-law detectors, the DC would be removed and the envelope signal passed on to the output as the recovered audio signal. The resulting distortion and gain modulation of the audio is generally considered unacceptable for high quality applications. Instead, the present detector takes the square root at block 46 of the filtered envelope signal without removing the DC component. In a double-sideband system, this recovers an audio signal which contains neither distortion components nor sampling artefacts, subject only to the constraint that the audio modulation is band-limited to one-quarter of the carrier frequency or less. This is readily achieved in the present embodiment. Since this is a vestigial sideband system, the audio signal is also present in un-squared form. The use of VSB modulation causes a slight increase in harmonic distortion level in such a demodulator (though not an increase in spurious signals). Accordingly block 46 actually mixes together square-rooted and untreated versions of the filtered envelope signal with frequency-dependent mixing filters optimized to yield perfect linearity for the particular VSB profile used.

A feature of this root-filter-square envelope detector 40 is that the filter 44 is specifically designed not to pass just the mean value, i.e. the DC component, but the envelope modulation as well, rejecting only the carrier-related components.

The linearity of the audio signal recovery or demodulation process is affected by the performance of the filter 44, particularly its phase response. Any substantial departure from either flat amplitude response or linear phase response in filter 44 impairs the inherent non-linearity cancellation which returns the original audio signal. Fortunately, filters meeting such specifications are straightforward to implement in the digital domain using standard design tools.

After the audio signal has been recovered successfully from the VSB modulated carrier by the detector, it is downsampled by a factor of 4 by decimation filter 48 to allow for more power-efficient digital audio processing in the rest of the receiver's audio digital signal processor DSP. Depending on the relationship between the carrier frequency $f_{carrier}$ and the cutoff frequency $f_{upper}$ of receiver filter 36, and the exact configuration of the final VSB demodulation (square-rooting) step, the demodulation causes a shelving frequency response which boosts low frequencies by 6 dB with respect to high frequencies. This can easily be compensated by the flexible audio response processing provided in the receiver's DSP, which is part of the readily-available hearing aid signal processing devices typically used to implement the receiver.

After optional audio processing in block 50, the signal is fed to a loudspeaker driver 52 for an earpiece 54.

An advantage of the above-described system is that it employs frequencies close to and within the audio band, avoiding the need for radio-frequency design techniques and permitting the use of standard hearing aid components, yet is resistant to electromagnetic interference through the combination of several signal processing techniques.

The carrier frequency and all transmitted sideband components are below 100 kHz, typically below 30 kHz, but do not extend down into the voice audio baseband occupied by the desired input signals. The desired audio signal can readily be recovered using standard low power audio digital signal processors of a type designed for use in hearing aids. The matching receiver uses a novel asynchronous digital demodulation technique which requires no local oscillator to recover the correct amplitude and frequency of the signal, while eliminating spurious demodulation products and resisting the influence of a wide range of interference signals, even some in the same frequency band as the system operates on.

It is an advantage that a standard audio DSP, coupled with other readily-available hearing aid components, can be used without any hardware alteration to completely recover the desired audio from the transmitter's modulated signal, to a high quality level with low background noise and spurious signal content. Thus, cost-effective receiver designs can be produced from standard components, and the full range of audio enhancement processing remains available. This leads to a far higher quality reception system in difficult environments, or for the use of hearing-impaired users, while obviating the need for custom circuit development.

Systems according to the present invention simultaneously solve the interference susceptibility problem of the conventional baseband solution, and the implementation complexity, power consumption and space requirement problems of the high frequency AM solution. They permit product design which offers the interference suppression capabilities of a high frequency AM-based system, but which is based on the same standard hearing aid components as the standard baseband solution and can deliver all the audio enhancement benefits of powerful standard hearing aid processors.

The sampling technique in the receiver 30 obviates the need for a synchronized local oscillator. No audible beat frequency components are produced between the incoming carrier frequency $f_{carrier}$ and the local sampling frequency $f_{sample}$. Minor variations in $f_{sample}$ have no impact on the received audio quality.

Various modifications may be made to the above-described arrangement.

For example, in the filter 48, the signal may be downsampled by 2 or another factor instead of 4.

Instead of an inductive arrangement 24, 300, capacitative, wired-resistive, electromagnetic or optical arrangements may be used to convey the signal from the transmitter 10 to the receiver 30.

Figure 4:
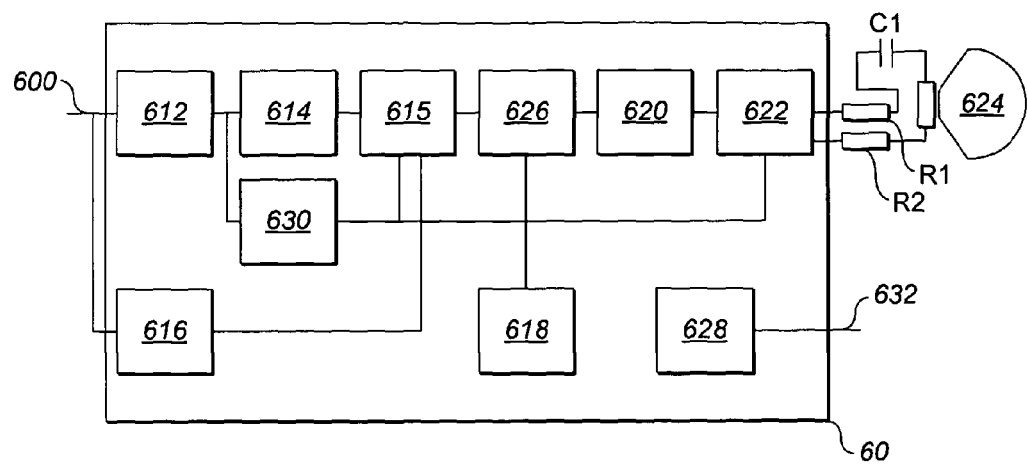
FIG. 4 is a diagram of a transmitter unit for use in a system according to a second embodiment of the present invention.

FIG. 4 shows a transmitter unit 60 for use in a system according to a second embodiment of the present invention. Several of the components correspond to those of FIG. 2 and have been given reference numerals increased by 600. The unit 60 is arranged to be worn or carried by a user, preferably around or below the neck.

The transmitter 60 is constructed from conventional widely available components such as operational and audio amplifiers, miniature single-gate logic devices, regulators and clock oscillators.

Input signals received at 600 via a cable from a cellular phone, hand-held communications receiver or portable computer are applied to an AC-coupled amplifier 612 which has automatic level control functionality, to obviate the need for a manual input sensitivity control. An open-circuit condition at the input 600 triggers detector 616 to emit a warning tone. Absence of an input signal above a certain level triggers detector 630 to emit an audible signal to reassure the user that the transmission is still present. The outputs of circuits 616 and 630 are also connected to a mixer 615 which mixes the input signal and the warning tone and adds a mix offset.

The signal is then applied to an active filter 614 to provide the functionality of filter 14 as discussed in connection with the first embodiment. The amplitude modulation is typically implemented using a balanced switching modulator 626 driven by a locally generated clock oscillator 618. This oscillator does not have to be particularly frequency-stable or low in phase noise or jitter, and so a crystal or ceramic resonator is not needed. For convenience, a pre-trimmed, resistor-set semiconductor oscillator can be used. This allows all transmitters to oscillate within a frequency span of 2% which is more than tight enough tolerance.

A second active lowpass filter 620 is used to suppress the higher order terms from the switching modulator in order to prevent high frequency overload of the final stage and to implement the functionality of filter 20 as discussed in connection with the first embodiment. This begins the shaping process whereby the double-sideband modulated signal is converted into VSB modulation. The final stage is formed from a standard low-power audio power amplifier 622, which is able to handle this signal because it is all in the upper reaches of the frequency band within which audio components are designed to operate.

The amplified, modulated signal is applied to an inductive loop transmitter 624 through a suitable matching transformer; protection resistors R1, R2 (typical values 10 ohms) are provided to guard against accidental short-circuit, and a small series capacitor C1 (typical value 20 nanoFarad) is used to reduce the amount of any low frequency modulation which may leak through to the transmitting coil.

The circuitry of receiver 60 is powered from voltage regulator 628 which is typically fed from an auxiliary power connection 632 from the same source device providing input signal 600. The power supply at 632 can be a battery or radio connection.

Alternatively, this capacitor can be made much larger (typically 100 microFarad) and the modulator intentionally unbalanced, so that a significant amount of baseband signal is also sent to the transmitting coil. In this way, the transmitter can simultaneously service both the VSB-receivers which form part of this invention, and conventional inductive receivers of the prior art.

Figure 5:
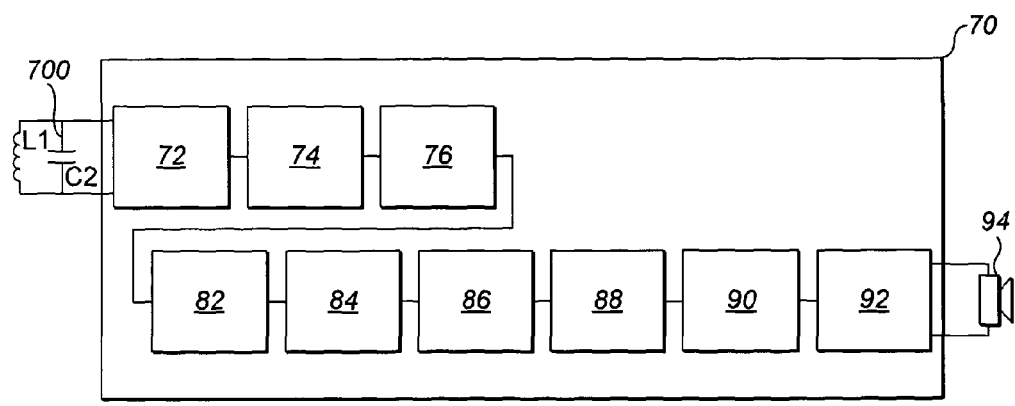
FIG. 5 is a diagram of a receiver unit for use in association with the transmitter unit of FIG. 4 in the second embodiment of the present invention.

FIG. 5 shows a receiver unit 70 for use in the system according to the second embodiment of the present invention. The unit 70 is arranged to be carried by the head of a user and preferably substantially or entirely within the user's ear canal. Several of the components correspond to those of FIG. 3 and have been given reference numerals increased by 40.

Receiver 70 is entirely implemented in a digital signal processing device (sometimes referred to as a 'hybrid' due to the construction technique employed). This hybrid device does not need to be purpose-designed to implement the receiver portion of this invention, but is a device widely available for the building of conventional digital hearing aids. The hybrid generates all the required processing and sampling clocks internally to a frequency accuracy of typically better than 5%.

The modulated magnetic field created by the transmitter 60 is sensed by T-coil 700. The T-coil is approximately tuned to the carrier frequency $f_{carrier}$ by means of resonating capacitor C2, the value of which is determined by the characteristics of T-coil 700, and has a typical value of 47 picoFarad. The voltage output of T-coil 700 is applied directly to the dedicated input of the hybrid, where it is pre-amplified at block 72 and then applied to the input of the analog-to-digital converter 74, 76. This ADC has as standard an inherent filtering characteristic which provides the lowpass response of the filter 36 as described in connection with the first embodiment.

All the remaining operations of the root-filter-square envelope detector are implemented in software running on the processing core of the hybrid. The recovered audio signal is then supplied to a package 80 of standard hearing aid sound enhancement algorithms which can significantly improve the effectiveness of this wireless link in noisy environments. Finally, the standard output drive circuits 92 of the hybrid are used to energize a small loudspeaker 94 which provides the audio signal directly to the wearer's ear canal.

In FIG. 5 the components 72, 74 and 76 can be identified as standard hardware blocks in a hearing aid "hybrid" arrangement, block 90 can be identified as standard hearing aid software and blocks 82-88 can be identified as a dedicated sampled-data root-filter-square VSB demodulator.

The receiver parts of the above-described embodiments can be manufactured economically because they are substantially identical to a conventional inductively-enabled in-ear hearing aid. They differ only in that the firmware for the hybrid has been rewritten to implement the receiver functionality of arrangements according to the present invention.

Receiver arrangements according to the present invention employ a common processor for demodulating the received signal and providing a suitably-amplified audio signal to the earpiece. Thus fewer components are required than in prior art arrangements.

When the transmitter and receiver are operated together, no accurate relationship is required between the frequency clocks on the transmit and receive sides of this wireless link. Any receiver of the same design will automatically receive the audio signal being applied to the audio input of the transmitting device, when the receiver is close enough to the transmitter. This distance is set by the magnetic coupling between the transmitting coil and the receiving coil.

The features and modifications of the embodiments may be interchanged or combined as desired.

The transmitting antennae 24, 624 and/or other components of the transmitter unit may be concealed within an article of clothing worn by the user, for example a hat, scarf, jacket, shoulder strap or brooch. Alternatively they may be mounted adjacent to the user, for example embedded in a headrest of a chair of a building, vehicle or craft occupied by the user.

The earpiece associated with the receiver unit may be adapted to a specific user by means of a customized ear canal mold so that it fits entirely within the ear canal without any external protrusions.

The invention claimed is:

1. A communication system comprising a transmitter unit arranged to be worn or carried by a user, or mounted adjacent to a user, and an earpiece comprising a receiver unit and sound-reproducing transducer, wherein the transmitter unit comprises an amplitude modulator arranged to modulate a carrier frequency signal with an incoming audio signal and a transmitter for transmitting the modulated signal, and wherein the receiver unit is arranged to receive the modulated signals transmitted by the transmitter unit via a link having a carrier frequency of less than 100 kHz, the receiver unit comprising a demodulator for demodulating the received signals and supplying the demodulated signals to the transducer, wherein the receiver unit includes an analog-to-digital converter and the demodulator comprises digital signal processing circuitry including a squaring unit for squaring the digital signal samples, a low-pass filter, a square rooting unit for taking the square root of the signals from the filter, and a decimation filter.

2. A system according to claim 1, wherein the link has a carrier frequency of less than 30 kHz.

3. A system according to claim 1, wherein the transmitter unit comprises a response shaping filter to effect vestigial sideband modulation, and wherein the demodulator is configured for demodulating the vestigial sideband modulated signal received via the link.

4. A system according to claim 1, wherein the carrier frequency lies within the range $f_{carrier}=14$ kHz to 18 kHz and the upper sideband is cut off at a frequency $f_{upper}=16$ to 22 kHz where $f_{upper}$ is greater than $f_{carrier}$.

5. A system according to claim 1, wherein a second decimation filter is provided between the analog-to-digital converter and the squaring unit.

6. A system according to claim 1, wherein the transmitter comprises filters located before and after the amplitude modulator.

7. A receiver unit arranged to receive amplitude-modulated signals via a link with a carrier frequency of less than 100 kHz, the unit comprising an analog-to-digital converter and a demodulator for demodulating the digitised received signals comprising digital signal processing circuitry including a squaring unit for squaring the digital signal samples, a low-pass filter, a square rooting unit for taking the square root of the signals from the filter, and a decimation filter.

8. A receiver unit according to claim 7, wherein the carrier frequency is less than 30 kHz.

9. A receiver unit according to claim 7, wherein the receiver unit is part of an earpiece.

10. A receiver unit according to claim 7, wherein a second decimation filter is provided between the analog-to-digital converter and the squaring unit.

* * * * *